United States Patent [19]

Narayanaswami

[11] Patent Number: 5,563,990
[45] Date of Patent: Oct. 8, 1996

[54] METHOD AND APPARATUS FOR PROCESSING A PICK EVENT

[75] Inventor: Chandrasekhar Narayanaswami, Austin, Tex.

[73] Assignee: International Business Machines Corporation, Armonk, N.Y.

[21] Appl. No.: 968,718

[22] Filed: Oct. 30, 1992

[51] Int. Cl.$^6$ ........................................... G06F 19/00
[52] U.S. Cl. ........................................... 395/133
[58] Field of Search ........................... 395/124, 134, 395/135, 133; 345/157

[56] References Cited

U.S. PATENT DOCUMENTS

| | | | |
|---|---|---|---|
| 3,816,726 | 6/1974 | Sutherland et al. | 235/152 |
| 4,698,779 | 10/1987 | Holden et al. | 364/520 |
| 4,814,755 | 3/1989 | Johnson et al. | 340/709 |
| 4,888,712 | 12/1989 | Barkans et al. | 395/134 |
| 4,941,111 | 7/1990 | Sfanti | 364/521 |
| 4,982,345 | 1/1991 | Callahan et al. | 364/521 |
| 5,051,737 | 9/1991 | Akeley et al. | 395/134 |
| 5,249,264 | 9/1993 | Matsumoto | 395/134 |
| 5,293,529 | 3/1994 | Yoshimura et al. | 345/158 |
| 5,329,613 | 7/1994 | Brase et al. | 395/122 |

FOREIGN PATENT DOCUMENTS 2226219 6/1990 United Kingdom.

OTHER PUBLICATIONS

"Computer Graphics Principles and Practice", J. D. Foley et al, Addison–Wesley Pub. Co., 2nd. ed., pp. 113–117, 1990.

*Primary Examiner*—Mark K. Zimmerman
*Attorney, Agent, or Firm*—Volel Emile; Paul S. Drake

[57] ABSTRACT

A method for processing whether a coplanar object intersects a picking volume. This method includes displaying the object on a display. This method also includes first calculating whether a plane containing the displayed object intersects any edges of the picking volume. This method further includes subsequently calculating whether the displayed object and the picking volume intersect when the plane of the object is determined to intersect any edges of the picking volume, and providing an indication whether the displayed object intersects the picking volume. In addition, an apparatus for processing whether a coplanar object intersects a picking volume. This apparatus includes a first apparatus for determining whether a plane containing the object intersects any edges of the picking volume and a second apparatus for determining whether the object and the picking volume intersect when the plane of the object is determined to intersect any edges of the picking volume.

24 Claims, 8 Drawing Sheets

METHOD AND APPARATUS FOR PROCESSING A PICK EVENT

TECHNICAL FIELD

The present invention relates generally to picking objects and more specifically to determining whether objects intersect a picking volume in multidimensional graphical applications.

BACKGROUND ART

In a multidimensional interactive graphics application it is necessary to detect whether any objects or primitives intersect a volume of interest called the picking volume. This is known as the picking problem. The picking volume may be a clipping volume for display purposes or it may be a separate, usually smaller, volume for selecting a primitive within the clipping volume. Typically, a picking volume is a volume enclosed by a plurality of planes and is usually cubical. Picking problems have traditionally been solved by clipping all the primitives with the picking volume using one of the commonly used clipping techniques. These clipping techniques typically utilize the Cohen-Sutherland coding technique to provide a trivial accept and reject test. However, if the test is unsuccessful in accepting or rejecting the primitive as being within the pick volume, the clipping techniques then typically calculate the intersection of the primitive with the picking volume. which is a computationally intensive task.

DISCLOSURE OF THE INVENTION

The present invention includes a method for processing whether a coplanar object intersects a picking volume including the steps of displaying the object on a display, first calculating whether a plane containing the displayed object intersects any edges of the picking volume, subsequently calculating whether the displayed object and the picking volume intersect when the plane of the object is determined to intersect any edges of the picking volume, and providing an indication whether the displayed object intersects the picking volume. In addition, the present invention includes an apparatus for processing whether a coplanar object intersects a picking volume including a first apparatus for determining whether a plane containing the object intersects any edges of the picking volume and a second apparatus for calculating whether the object and the picking volume intersect when the plane of the object is determined to intersect any edges of the picking volume.

A further understanding of the nature and advantages of the present invention may be realized by reference to the remaining portions of the specification and the drawings.

BEST MODE FOR CARRYING OUT THE INVENTION

The present invention is directed to processing a pick event by detecting whether an object or primitive is located within a picking volume without having to determine the intersection of the object or primitive with the picking volume using known clipping techniques. It is sufficient to detect whether the object or primitive intersects the picking volume without calculating the point of intersection in order to process the object or primitive as being picked in most application. This simplification results in simpler hardware, reduced costs, and faster execution.

Figure 1:
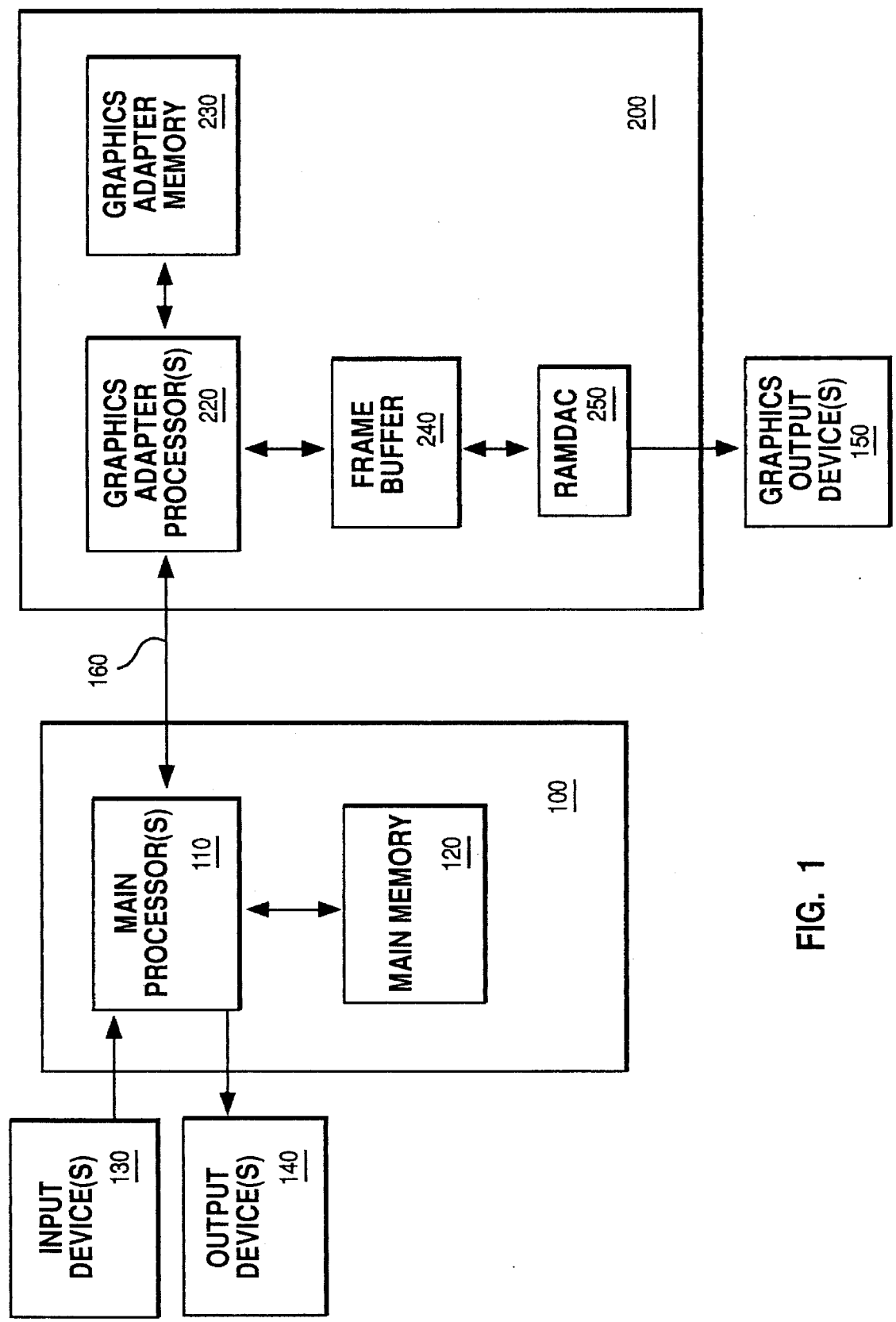
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120, input device(s) 130 and output device(s) 140. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 150 such as a graphics display through a graphics adapter 200. Graphics adapter 200 receives instructions regarding graphics from main processor 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphic processors 220 may also include specialized rendering hardware for rendering specific types of primitives to be rendered. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
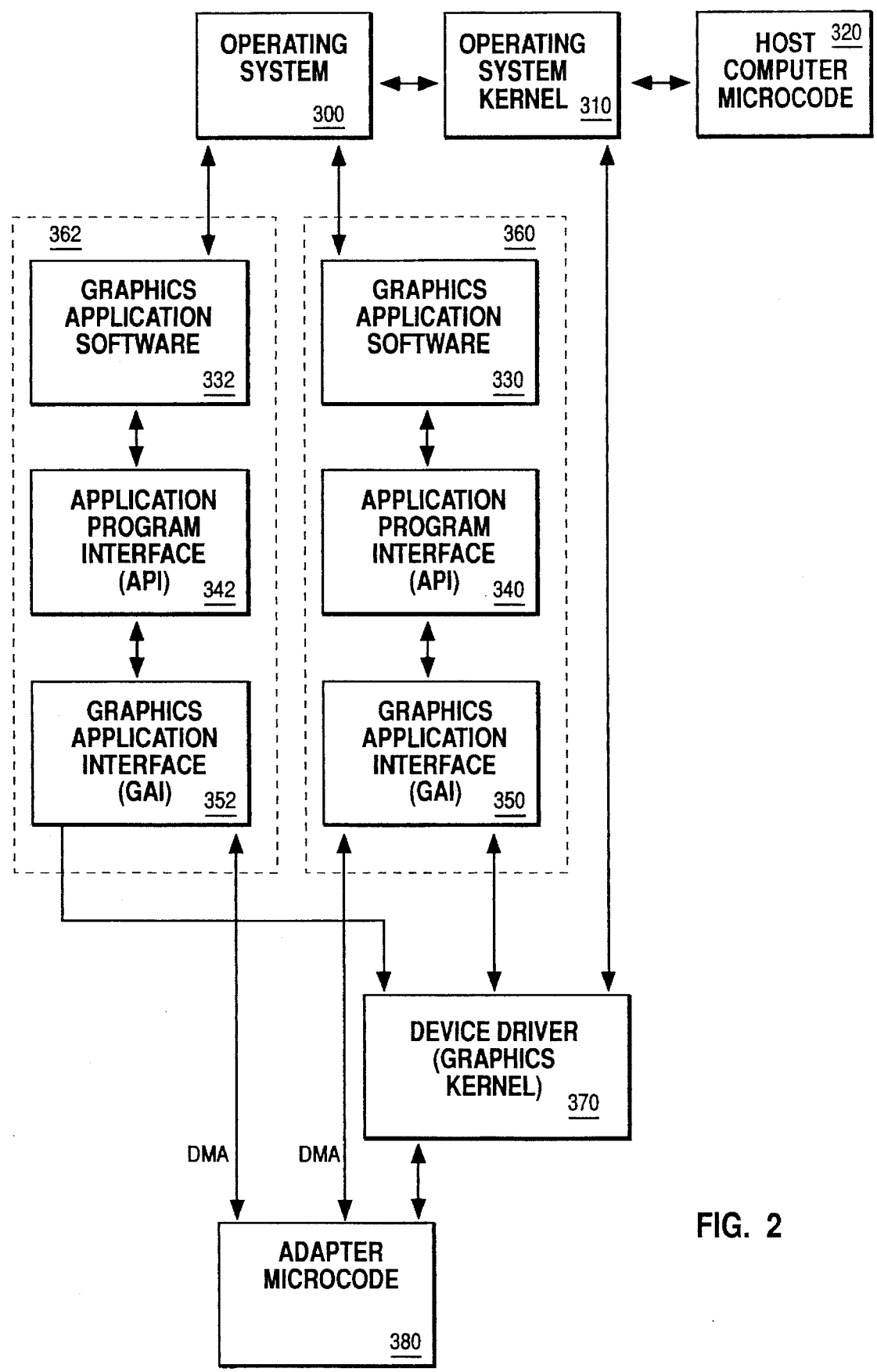
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions such as pick events. A pick event is an event where a object is picked using a pick volume for performing some function on the object such as erase, change color, move, etc. An operating system 300 such as DOS provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for quicker transmission of data between the host computer and the adapter by eliminating the need to go through the display driver other than the initial request for the device driver to set up the DMA. In some the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that typically independent of the type of graphics adapter being utilized. Blocks 350–380 are software code layers that are typically dependent upon the type of graphics adapter being utilized. For example, if different graphics adapter were to be used by the graphics application software, then a new GAI, graphics kernel and adapter microcode would be needed. In addition, blocks 300–370 reside on and are executed by the host computer. However, the adapter microcode 380 resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window. The adapter microcode then breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified. This also presents a difficulty when trying to pick a displayed image in the window. In a typical three dimensional model, when a user has an image including many objects displayed in a window, a complicated and sometimes time consuming process is followed to pick a desired object.

In the preferred embodiment, the pick technique could be utilized in many locations such as the adapter microcode which is close to the adapter frame buffer. This approach would also be relatively quick and fairly easy to implement. In addition, the pick technique could be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. The pick technique could also be implemented in hardware in the graphics adapter processor. This approach is extremely quick but would probably necessitate specialized hardware. This would allow for rapid picking of primitives displayed by the graphics adapter. One of ordinary skill in the art can appreciate that the present technique could be applied in many other locations within the host computer or graphics adapter.

Figure 3:
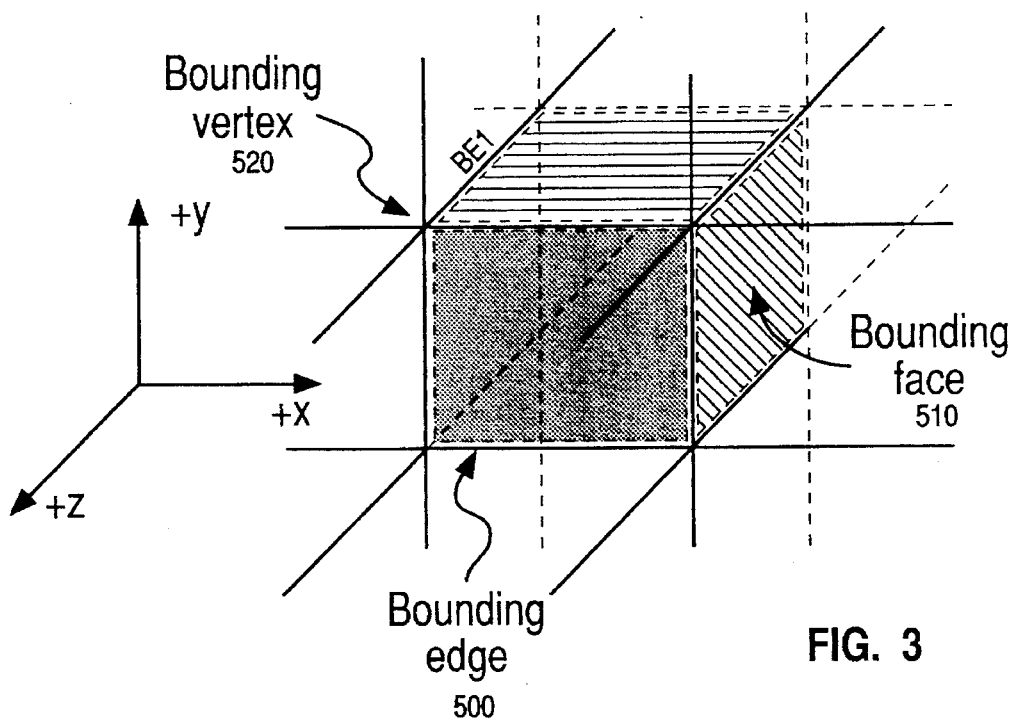
FIG. 3 is an illustration of a preferred picking volume bounded by faces, edges and vertices.

As illustrated in FIG. 3, the preferred picking volume is typically bounded by six bounding planes and twelve bounding edges. However, a picking volume may have two or more dimensions and may be bounded by more or fewer bounding planes. A bounding edge 500 is that part of the edge of intersection between two adjacent bounding planes that lies inside the picking volume. A bounding face 510 is that part of the bounding plane that is common to the picking volume. The bounding planes partition three dimensional space into 27 non-overlapping regions of which the picking volume is one. The 26 other regions are called outer regions. The eight corner vertices of the picking volume (i.e. the points of intersection of three adjacent bounding planes) are bounding vertices 520. The bounding faces, edges and vertices are considered to be inside the picking volume.

Figure 4:
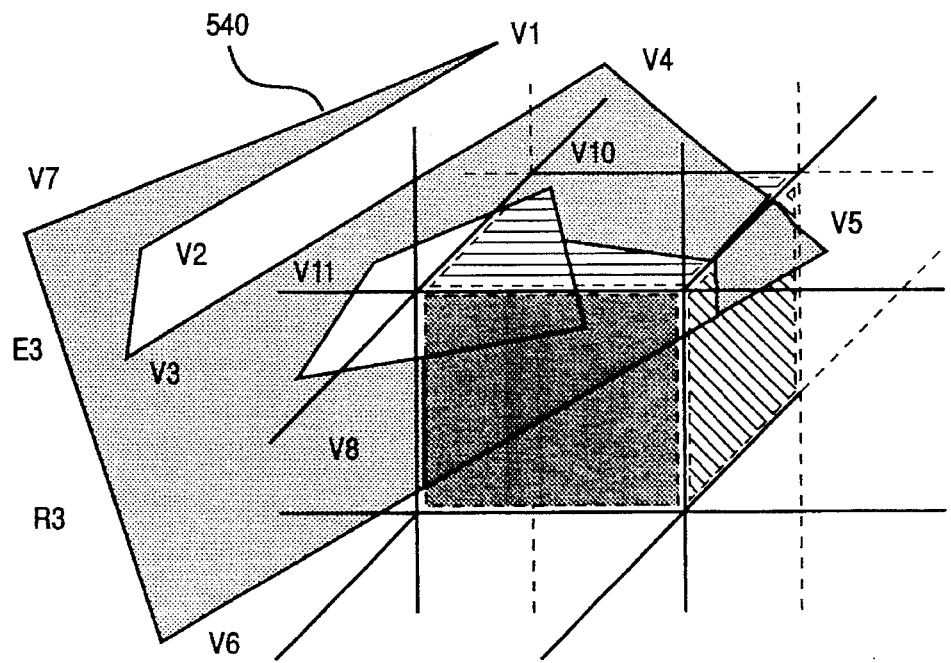
FIG. 4 is an illustration of a concave primitive with a hole intersecting the picking volume.

A primitive is typically specified by an ordered set of coplanar vertices. The primitive can be either convex or concave and can contain holes. FIG. 4 is an illustration of a concave primitive 540 with a hole intersecting the picking volume. The picking of this object is described in greater detail below with reference to FIG. 8.

Figure 5:
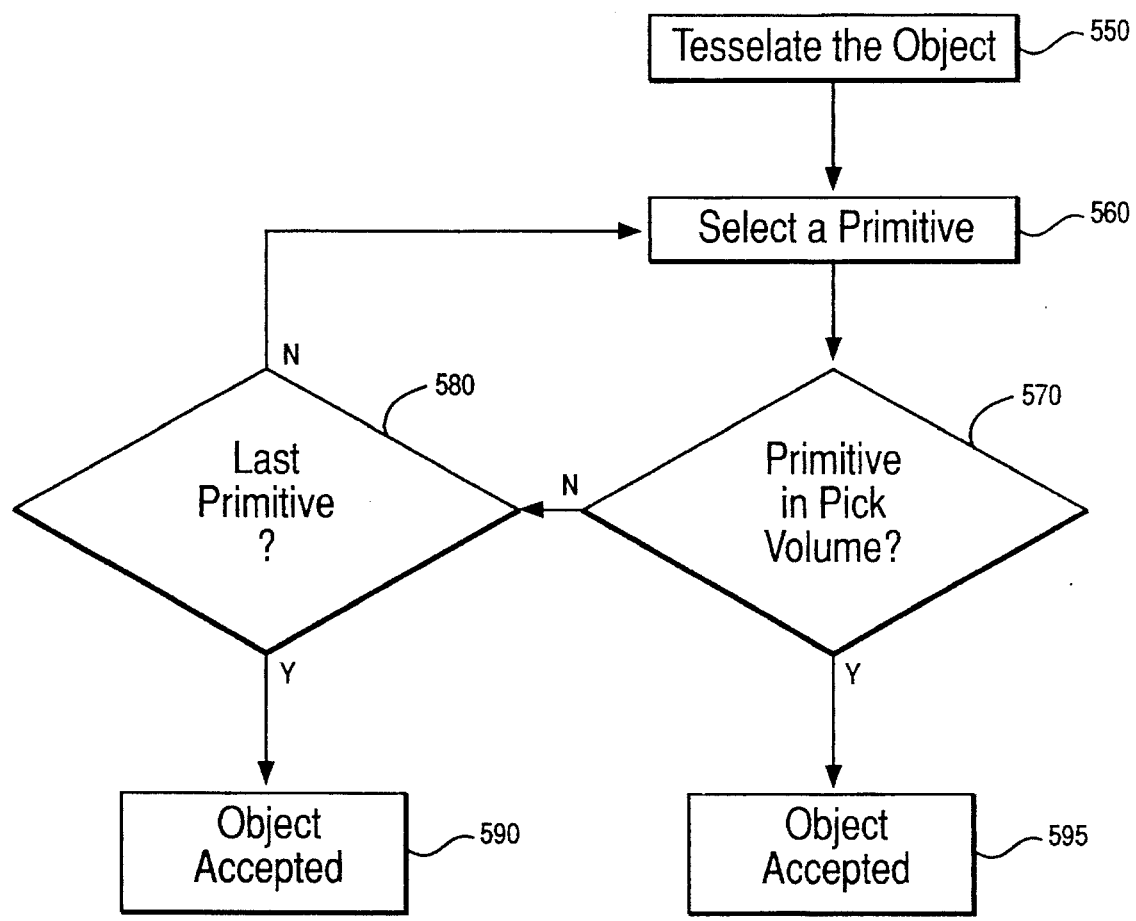
FIG. 5 is a flowchart illustrating a preferred method for determining whether an object is within or partially within a picking volume.

FIG. 5 is a flowchart illustrating how to determine whether a non-coplanar object may be within or partially within the picking volume. In step 550, the primitive is tessellated into a plurality of coplanar primitives, each primitive being defined by a set of vertices. If the object is coplanar, then the object may be a single primitive as shown in FIG. 4. In step 560, a primitive is selected from the object. In step 570, it is determined whether the primitive is located within or partially within the pick volume. This step is described in greater detail in FIGS. 6A–6B below. If the primitive is not located within the pick volume, then step 580 determines whether it is the last primitive within the object. If not, then processing returns to step 560 to select the next primitive. Otherwise, the object is rejected as none of the primitives of the object are within the pick volume. If one of the primitives of the object intersects the pick volume from step 570, then the object is accepted in step 595.

Figure 6A:
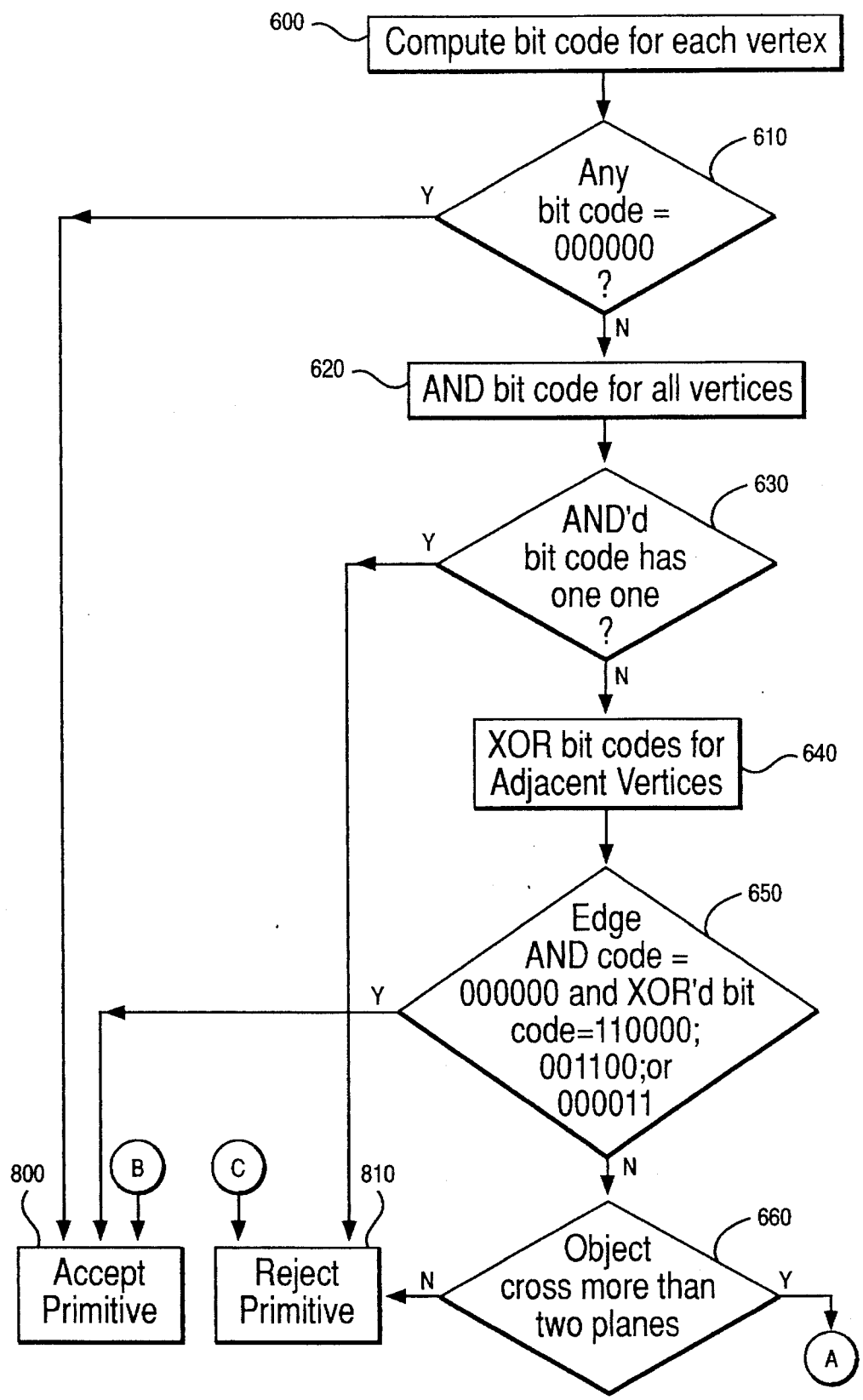
FIGS. 6A–6B are a flowchart illustrating a preferred method for determining whether a coplanar primitive or object is within or partially within a picking volume.
Figure 6B:
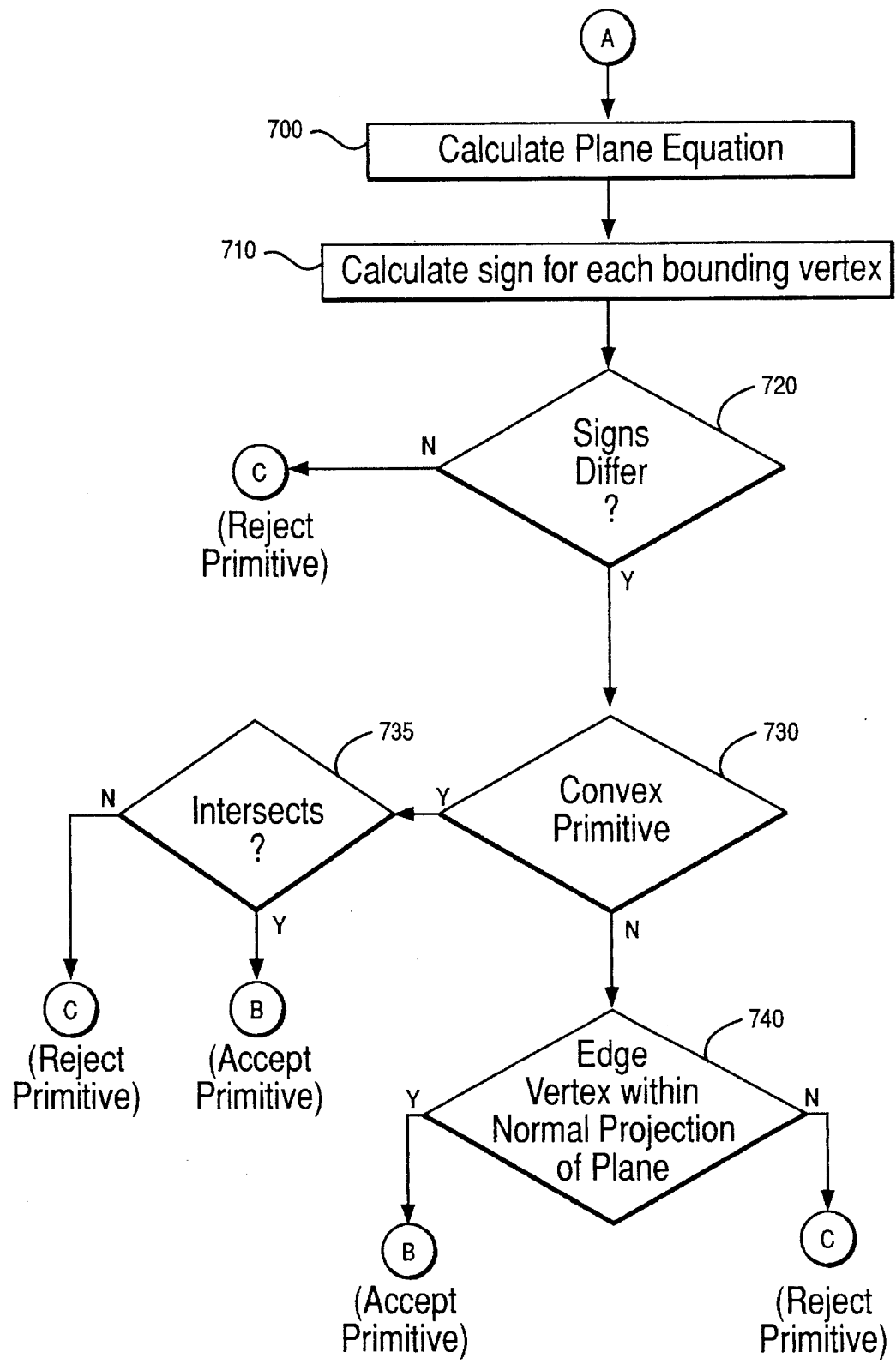

FIGS. 6A–6B are a flowchart illustrating the method of the preferred embodiment of the invention for determining whether a coplanar primitive or object defined by a set of vertices is within or partially within the picking volume. In a first step 600, a six bit code is computed for each vertex of the primitive according to the Cohen-Sutherland technique. That is, each vertex of the primitive is classified as to be in either the picking volume side or the infinity side of each of the bounding planes of the picking volume. Each bit of the bit code designates whether the vertex is inside or outside a particular plane with a respective designation of 0 or 1. If a vertex is on the picking volume side of all the six bounding planes it is inside the picking volume and has a bit code 000000.

Figure 7:
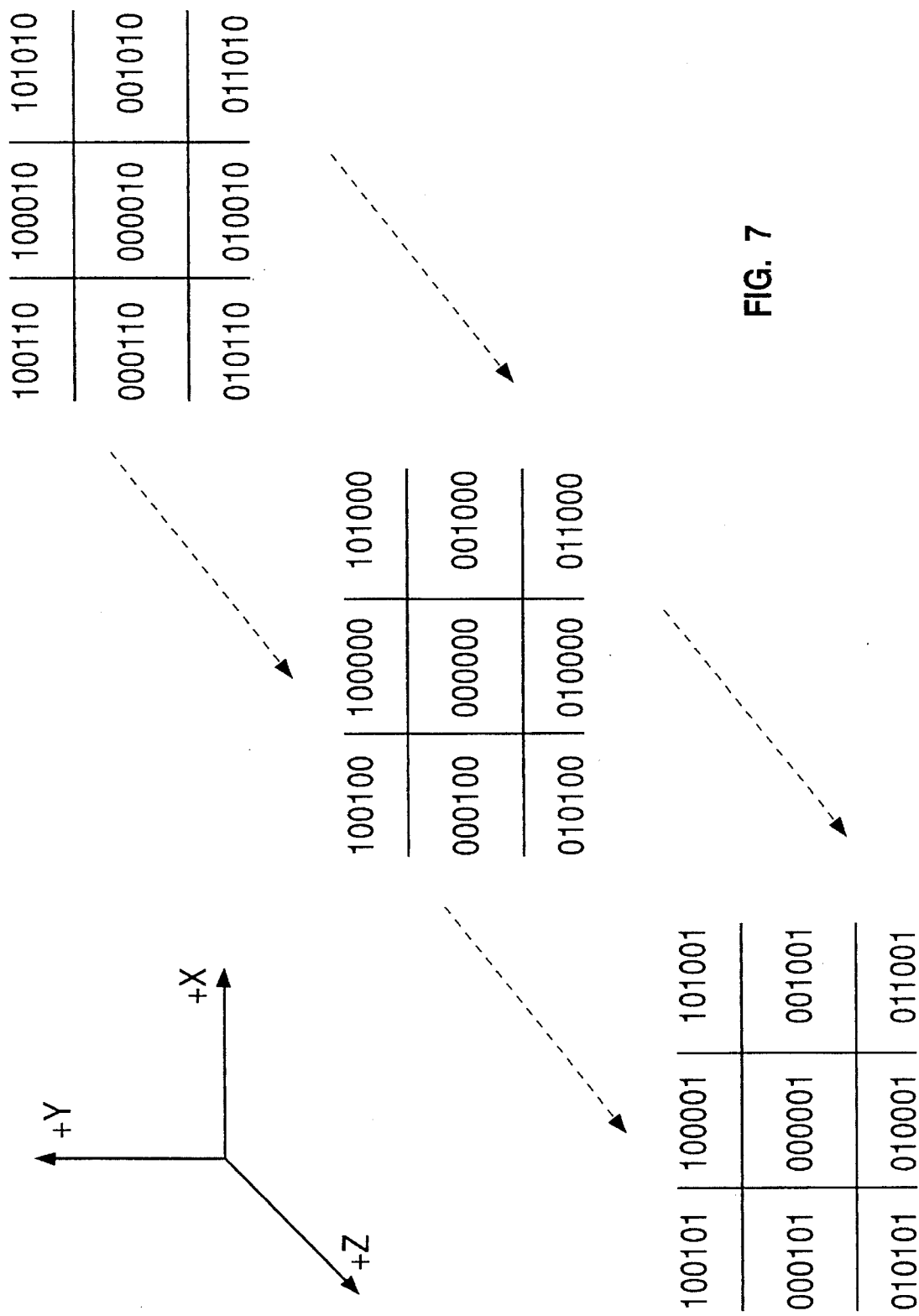
FIG. 7 illustrates a bit code for each of the 27 regions of the picking volume.

FIG. 7 illustrates a bit code for each of the 27 regions. Bit 1 refers to a point above the picking volume in the Y direction, bit 2 refers to a point below the picking volume in the Y direction, bit 3 refers to a point to the right of the picking volume in the X direction, bit 4 refers to a point to the left of the picking volume in the X direction, bit 5 refers to a point behind the picking volume in the Z direction, bit 6 refers to a point in front of the picking volume in the Z direction. Of course, alternative bit code schemes may be utilized.

In step 610 of FIG. 6A, if any of the primitive bit codes is equal to 000000, then the vertex lies inside the picking volume and at least a portion of the primitive lies inside the picking volume. Therefore, the primitive is trivially accepted and is processed as a hit in step 800. Otherwise, processing continues to step 620. In step 620, the logical AND of all of the vertices bit codes is calculated. In step 630, if the logical AND of the endpoints has only one one (e.g. 001000), then the the entire primitive lies outside the picking volume and the primitive is trivially rejected and processed as such in step 810. That is, if all vertices of the primitive are in the same outer region, the primitive cannot intersect the picking volume and hence the primitive is not a hit.

As soon as the primitive is either trivially accepted or rejected, then no further processing is needed to determine whether that primitive is within the picking volume. Under normal applications, this is the case for most primitives. One particular problem arises during this further processing where none of the vertices may lie inside the picking volume and yet part of the primitive may be inside the picking volume. This case cannot be detected by merely checking whether the vertices are within the picking volume. However, for the few primitives that require further processing, that processing could be computationally intensive and can be processed efficiently utilizing the present invention as described herein.

If the primitive is not trivially rejected or trivially accepted in the above processing steps, then further processing of the primitive is required. If primitive is within the picking volume, then one of the edges of the primitive must intersect the picking volume or a bounding edge of the picking volume must intersect the primitive. Therefore, in the preferred embodiment, processing continues an edge at a time rather than a vertex at a time.

To detect whether an edge of the primitive intersects the picking volume, it is efficient to first determine whether a possibility of such an intersection exists. For example, since both vertices of the edge are outside the pick volume, an intersection can occur only if the bit codes for any two adjacent vertices (defining a primitive edge) differ in at least two planes. In addition, in some cases it is possible to accept or reject that the primitive intersects the picking volume by just examining the bit codes for the two vertices of the edge. In step 640, the two vertex bit codes for each primitive edge are logically XOR'd together. In step 650, the bit codes are checked to see if they AND to 000000 and the XOR'd bit code is checked to see if any value is 110000, 001100 or 000011. If both are true, then the edge intersects the picking volume and the primitive is accepted as being within the picking volume. In step 660, if the XOR'd bit code for the primitive contains one one less ones, (and given that no vertex is within the picking volume as determined above), then the primitive is rejected as not being within the picking volume. Step 660 may be combined with step 630 for purposes of efficiency. These steps are separated here for illustrative purposes.

The above described trivial reject and accept tests and the edge intersection tests are used in the preferred embodiment for efficiency. However, the below described process may be used even if the above tests were not performed.

The final determination of a primitive intersecting the picking volume is more difficult but is conclusive unlike the above described processes. Basically, it is determined whether any of the bounding edges intersects the primitive. A necessary condition for a bounding edge to intersect the primitive is that the two vertices of the bounding edge must be on opposite sides of the plane containing the primitive. To determine which side of a plane a bounding edge vertex lies and to check if the bounding edge intersects a primitive, it is determined whether a plane extending from the plane of the primitive intersects the picking volume. In step 700, the primitives plane equation $ax+by+cz+d=0$ is determined from three noncollinear vertices selected from the primitive. Often, the normal for the primitive, i.e., a, b, and c from the above formula, are already calculated by the graphics application and are readily available. In these cases d can be determined with the coordinates of any vertex of the primitive.

In step 710, the sign of $P(x,y,z)$ where $P(x,y,z)=ax+by+cz+d$ is evaluated at each of the eight bounding vertices. In step 720, if none of the signs for the two vertices of any of the twelve bounding edges differ then the primitive does not intersect the picking volume and the primitive is rejected. If the signs for any of the vertices for any bounding edge do differ, then processing continues to step 730.

In step 730, if the primitive is known to be convex, then in step 735 the primitive is tested to see if it intersects the picking volume by attempting to calculate the intersection of the primitive and the picking volume. This is an optional test and may not be utilized. If the primitive is not known to be convex or if the test is not desired, then processing continues to step 740.

In step 740 if the two vertices of a bounding edge lie on opposite sides of the primitive and a point on the bounding edge is contained within the projection of the primitive in the plane orthogonal to the bounding edge, then the primitive intersects the picking volume and the primitive is accepted. If not, then the primitive is rejected. This test, called a projection test, is true whether the coplanar primitive is concave, convex, with holes, or without holes so long as it has already been determined that the plane of the primitive intersects the picking volume as described in steps 700–720 above. As a result, this is a very powerful test and it is particularly useful when working with complex coplanar primitives. That is, such complex coplanar primitives do not need to be broken into multiple simple primitives for determining whether they intersect the picking volume. In addition, the actual point of intersection between the primitive and the picking volume has not been calculated, thereby providing an efficient approach to picking.

Figure 8:
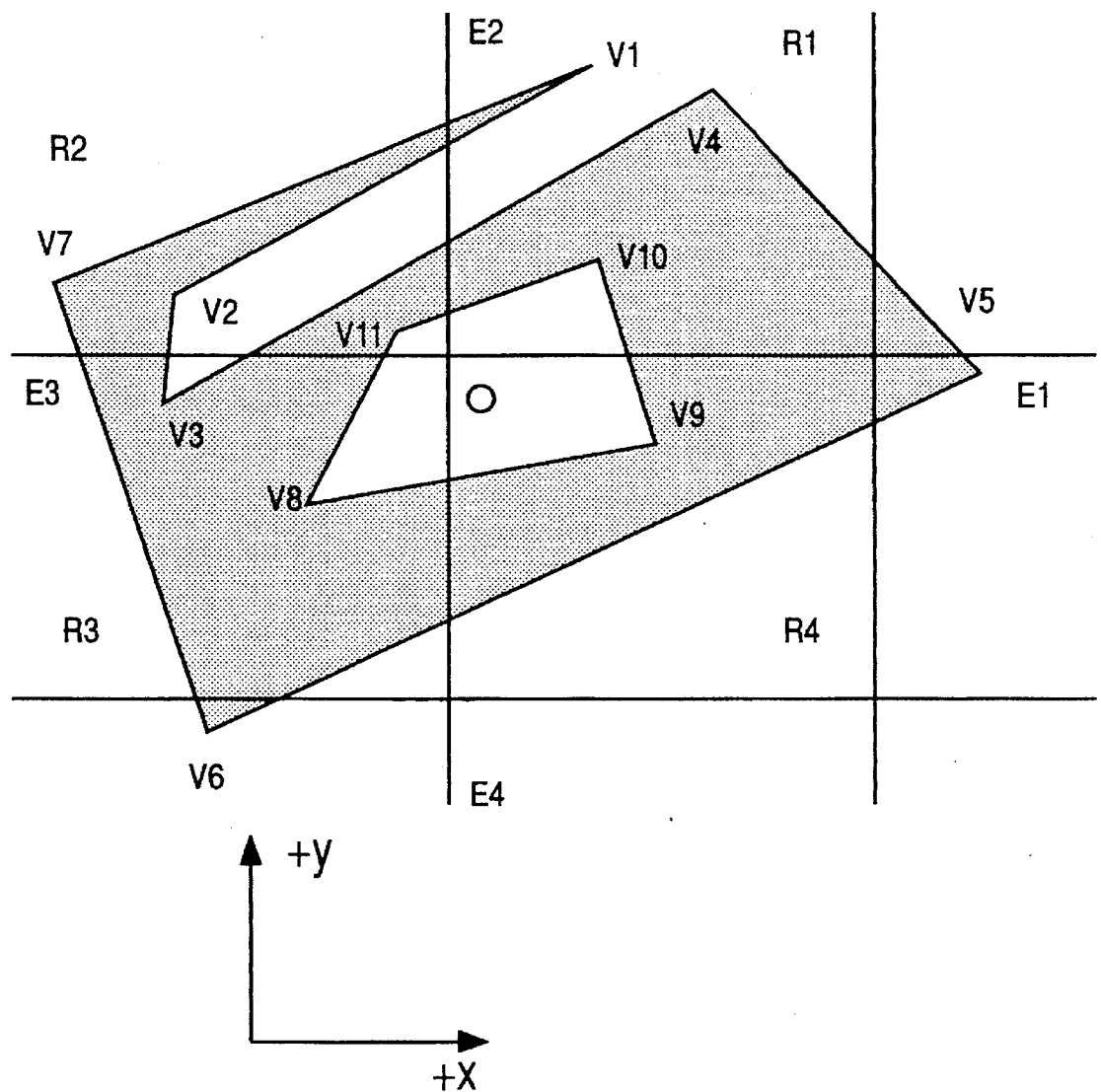
FIG. 8 is a projection of the object of FIG. 4 onto a plane perpendicular to one of the bounding edges.

FIG. 8 illustrates an example of how a bounding edge of the picking volume intersecting a primitive is detected for the concave primitive with a hole that was illustrated in FIG. 4. FIG. 8 Shows the projection of the primitive in a plane, $P_{proj}$ (the x-y plane in this example), perpendicular to the bounding edge E1, the top left edge in this example). The bounding edge projects to a point O in $P_{proj}$. The bounding edge in question here is the intersection of the bounding planes P1, the left bounding plane, and P2, the top bounding plane. Edges E1 and E3 are the projections of the bounding plane in $P_{proj}$. Edges E2 and E4 are the projections of the bounding plane in $P_{proj}$. The edges E1–E4 generate four regions R1–R4 in the projection. Each of these regions is bounded by two of the edges from E1–E4. The projected edges of the primitive should be oriented so that it is possible to determine whether O is above or below the edge. In an alternative embodiment, calculating intersections may be avoided by calculating and evaluating O with respect to edge equations and determining how many edges are above O.

In FIG. 8, O is contained within the projection of the primitive in $P_{proj}$ if it is circled an odd number of contours of the primitive. If O is circled an even number of times it is outside the primitive. A contour of the primitive circles O if any one of the edges E1–E4 is intersected an odd number of times by the edges of the contour. If any one of the edges E1–E4 is intersected an even number of times the contour does not circle O. The conditions can be detected with the use of the six digit bit codes calculated earlier. No intersection calculations are necessary when two consecutive vertices of the primitive are in the same region or in adjacent regions. Vertices V1 and V2 are an example of this case. When consecutive vertices lie in non-adjacent regions a computation of an intersection is necessary. Vertices V3 and V4 are an example of this case. Edges V3–V4 and V5–V6 show why an intersection computation is necessary. The edge BE1 does not stab the primitive since O is not contained within the projection of the primitive in the plane $P_{proj}$.

Using the above described method, convex and concave polygons with and without holes can be handled by the present invention.

Tables 1–6 include pseudocode for determining whether an object intersects a picking volume using the present invention. Table 1 is directed to the higher level processing where an object is tessellated into multiple code plane or primitives where each primitive has multiple vertices. Each primitive is then tested in sequence to determine whether any of the primitives are included in the pick volume. If any of the primitives are within the pick volume, then the object is determined to be within the pick volume. Otherwise, if none of the primitives intersect the pick volume, then the object itself does not intersect the pick volume.

TABLE 1

Pseudocode for Object Processing:
   object_test:
      tessellate object into M coplanar primitives with each primitive having a vertex_list N+1 vertices long, the first vertex listed a second time after the last vertex for handling the last edge;
      for (each primitive in object) I=1 to M:
         set HIT=NO and MISS=NO;
         perform primitive_test with Ith primitive;
         if HIT=YES then go to declare_hit;
   next (primitive) I:
   because no primitive of the object is a hit, declare the object as not a hit, i.e. not intersecting the pick volume;
   end program;
   declare_hit:
      declare the object as a hit, i.e. intersecting the pick volume;
   end program;

Table 2 is pseudocode for determining whether a coplanar primitive lies within the picking volume. There are several tests performed in sequence to determine whether or not the coplanar primitive intersects the pick volume. The Cohen-Sutherland point intersection test is first performed and is described in greater detail below with, reference to Table 3. If the primitive is trivially accepted or rejected, then processing returns to the above object test. In a second test, it is determined whether any of the edges of the primitive may intersect the picking volume. This is described in greater detail below with reference to Table 4. The trivial_point_intersection_test and the edge_intersection_test may be combined into a single loop. They are shown here as separate procedures for illustrative purposes. If there is a hit or a miss, then processing returns to object_test. In a third test, it is determined whether a projection of the primitive plane intersects any of the bounding edges. This is described in greater detail below with reference to Table 5. If it is determined from this test that the primitive does not intersect the picking volume, then processing returns to the object test. In a fourth test, if the polygon is known to be convex, then the actual intersection of the polygon with the picking volume is calculated to determine whether the polygon does or does not intersect the picking volume. This procedure can be combined with the edge intersection test and the trivial point intersection test for efficiency. Processing then returns to the object test. If a primitive edge is known to cross at least two planes and the plane of the primitive intersects the pick volume, then the primitive may intersect the picking volume. In a fifth test, in the case the polygon is not known to be convex or if the convex test is not desired, then a projection test is performed as is described with greater detail below with reference to Table 6. At the conclusion of this test, processing returns to object_test.

TABLE 2

Pseudocode for Primitive Processing
   primitive_test:

perform trivial_point_intersection_test;
if HIT=YES or MISS=YES
   return to object_test;
perform edge_intersection_test;
if HIT=YES or MISS=YES
   return to object_test;
perform bounding_edge_test;
if MISS=YES
   return to object_test;
if polygon known to be convex
   calculate intersection with picking volume
      If intersection then set HIT=YES
         else set MISS=YES;
      return to object_test;
perform projection test;
return to object_test;

Table 3 includes pseudocode for performing the Cohen-Sutherland trivial accept or reject test. This is a variant of the well known trivial accept and reject test described in the prior art. This test is optional but may be needed if the edge_intersection_test is performed.

TABLE 3

Pseudocode for Cohen-Sutherland Test:
   trivial_point_intersection_test:
   set AND_CODE=111111;
   for (each vertex in primitive) J=1 to N+1:
      set V_CODE(J)=6 bit code for vertex;
      if V_CODE(J)=000000
         set HIT=YES
         return to primitive_test;
      set AND_CODE=AND_CODE AND V_CODE(J);
   next (vertex) J;
   If AND_CODE has one one
      set MISS=YES;
   return to primitive_test;

Table 4 includes pseudocode for determining whether an edge of the primitive crosses at least two planes. In addition, if the edge crosses a particular set of two planes as shown below, then the primitive is known to intersect the picking volume. This test is optional but is preferred if the primitive is known to be convex and the test for convex polygons is to be performed.

TABLE 4

Pseudocode for Edge Intersection Test
   edge_intersection_test:
   set MISS=YES;
   for (each edge in primitive) J=1 to N:
      set XOR_CODE=V_CODE(J) XOR V_CODE(J+1);
      if (V_CODE(J) AND V_CODE(J+1)=000000) and
         (XOR_CODE=(000011 or 110000 or 001100))
         set HIT=YES and MISS=NO
         return to primitive_test;
      If XOR_CODE has two or more ones
         set MISS=NO;
   next (edge) J;
   return to primitive_test;

Table 5 includes pseudocode for determining whether any of the bounding edges is intersected by the plane of the primitive. This is determined by calculating the plane equation for the primitive. However, the normal for the plane may already be provided by the graphics application or previous processing such that this plane equation calculation is simple. Once the plane is calculated if any of the bounding edges have vertices which different in sign when the plane equation is applied, then that bounding edge may be intersected by the primitive and further processing is needed. This test does not require that the Cohen-Sutherland or the edge_intersection_test be performed.

TABLE 5

Pseudocode for Bounding Edge Test:
   bonding_edge_test:
   calculate plane equation for primitive;

$$P(x,y,z)=ax+by+cz+d$$

calculate P(x,y,z) for each pick volume vertex if sign of all vertices equal then
      set MISS=YES
      return to primitive_test;
   set E(K)=K edges with opposite sign vertices; return to primitive_test;

Table 6 is pseudocode for determining whether any potentially intersecting bounding edge has a vertex that lies within a projection of the primitive plane to the normal of the edge. If so, then the primitive intersects the picking volume. This test is preferably preceded by the execution of the bounding_edge_test. However, this test does not require that the Cohen-Sutherland test or the edge_intersection_test be performed.

TABLE 6

Pseudocode for Projection Test
   projection_test:
   for (each bounding edge E) J=1 to K if either bounding edge vertex of E(J) lies inside the projection of the primitive plane P(x;y,z) to which edge E(J) is a normal, then set HIT=YES and return to primitive-test;
   next (bounding edge E) J In conclusion, the present invention does not require the extensive numerical calculations utilized by clipping techniques. This simplifies the control logic necessary and thereby reduces hardware costs and execution times.

Although the present invention has been fully described above with reference to specific embodiments, other alternative embodiments will be apparent to those of ordinary skill in the art. For example, the above described procedures may be applied to two dimensional or four or more dimensional picking volumes. Therefore, the above description should not be taken as limiting the scope of the present invention which is defined by the appended claims.

What is claimed is:

1. A method for processing in a data processing system whether a planar object in a three dimensional space intersects a three dimensional picking volume comprising the steps of:

a) displaying the planar object on a display;

b) first calculating in a processor whether a plane containing the displayed object in the three dimensional space intersects an edge of the three dimensional picking volume;

c) subsequently calculating in the processor whether the displayed object and the picking volume intersect when the object is determined to intersect the edge of the picking volume previously calculated to intersect the plane containing the displayed object; and d) displaying an indication whether the displayed object intersects the picking volume.

2. The method of claim 1 wherein the step of subsequently calculating includes calculating whether a point along the intersected picking volume edge intersects a projection of the object onto a plane normal to the intersected picking volume edge.

3. The method of claim 2 wherein the step of subsequently calculating includes calculating whether a vertex of the intersected picking volume edge intersects a projection of the object onto a plane normal to the intersected picking volume edge.

4. The method of claim 3 wherein the step of first calculating includes obtaining a plane equation of the object.

5. The method of claim 4 wherein the step of first calculating includes using the obtained plane equation to calculate a sign for at least two vertices of the picking volume.

6. The method of claim 5 further comprising a step of calculating whether the object crosses at least two bounding planes of the picking volume.

7. An apparatus for processing in a data processing system whether a planar object in a three dimensional space intersects a three dimensional picking volume comprising:

a) first means for utilizing a processor for determining whether a plane containing the object in the three dimensional space intersects an edge of the three dimensional picking volume;

b) second means for utilizing the processor for determining whether the object and the picking volume intersect when the object is determined to intersect the edge of the picking volume previously determined to intersect the plane containing the object; and c) third means for displaying an indication whether the object intersect the picking volume.

8. The apparatus of claim 7 wherein the second means for determining includes means for calculating whether a point along the intersected picking volume edge intersects a projection of the object onto a plane normal to the intersected picking volume edge.

9. The apparatus of claim 8 wherein the second means for determining includes means for calculating whether a vertex of the intersected picking volume edge intersects a projection of the object onto a plane normal to the intersected picking volume edge.

10. The apparatus of claim 9 wherein the first means for determining includes means for obtaining a plane equation of the object.

11. The apparatus of claim 10 wherein the first means for determining includes means for using the obtained plane equation to calculate a sign for at least two vertices of the picking volume.

12. The apparatus of claim 11 further comprising means for determining whether the object crosses at least two bounding planes of the picking volume.

13. A data processing system comprising:

a) a memory for storing a planar object;

b) a display for displaying the stored object;

c) a processor for processing the displayed object in a three dimensional space, said processor including:

i) first means for determining whether a plane containing the displayed object in the three dimensional space intersects an edge of a three dimensional picking volume;

ii) second means for determining whether the displayed object and the picking volume intersect when the stored object is determined to intersect the edge of the picking volume previously determined to intersect the plane containing the displayed object; and iii) third means for displaying an indication whether the object intersect the picking volume.

14. The data processing system of claim 13 wherein the second means for determining includes means for calculating whether a point along the intersected picking volume edge intersects a projection of the object onto a plane normal to intersected picking volume edge.

15. The data processing system of claim 14 wherein the second means for determining includes means for calculating whether a vertex of the intersected picking volume edge intersects a projection of the object onto a plane normal to the intersected picking volume edge.

16. The data processing system of claim 15 wherein the first means for determining includes means for obtaining a plane equation of the object.

17. The data processing system of claim 16 wherein the first means for determining includes means for using the obtained plane equation to calculate a sign for at least two vertices of the picking volume.

18. The data processing system of claim 17 wherein the processor further includes means for determining whether the object crosses at least two bounding planes of the picking volume.

19. A computer program product comprising:

a computer usable medium having computer readable program code means embodied in said medium for determining whether a planar object in a three dimensional space intersects a three dimensional picking volume, said computer program product having:

a) first computer readable program code means for causing a computer to effect determining whether a plane containing the object in the three dimensional space intersects an edge of the three dimensional picking volume;

b) second computer readable program code means for causing a computer to effect determining whether the object and the picking volume intersect when the object is determined to intersect the edge of the picking volume previously calculated to be intersected by the plane containing the displayed object; and c) third computer readable program code means for causing a computer to effect displaying an indication whether the object intersects the picking volume.

20. The computer program product of claim 19 wherein the second computer readable program code means includes computer readable program code means for causing a computer to effect calculating whether a point along the intersected picking volume edge intersects a projection of the object onto a plane normal to the intersected picking volume edge.

21. The computer program product of claim 20 wherein the computer readable program code means for causing a computer to effect calculating includes computer readable program code means for causing a computer to effect calculating whether a vertex of the intersected picking volume edge intersects a projection of the object onto a plane normal to the intersected picking volume edge.

22. The computer program product of claim 21 wherein the first computer readable program code means includes computer readable program code means for causing a computer to effect obtaining a plane equation of the object.

23. The computer program product of claim 22 wherein the first computer readable program code means includes computer readable program code means for causing a computer to effect using the obtained plane equation to calculate a sign for at least two vertices of the picking volume.

24. The computer program product of claim 23 further comprising computer readable program code means for causing a computer to effect determining whether the object crosses at least two bounding planes of the picking volume.

* * * * *